United States Patent [19]

MacAfee

[11] 3,868,601

[45] Feb. 25, 1975

[54] DIGITAL SINGLE-SIDEBAND MODULATOR

[75] Inventor: John W. MacAfee, San Diego, Calif.

[73] Assignee: The United States of America as represented by the Secretary of the Navy, Washington, D.C.

[22] Filed: June 18, 1973

[21] Appl. No.: 371,316

[52] U.S. Cl. .................... 332/45, 325/38 R, 325/50, 325/137

[51] Int. Cl. ............................ H03c 1/60, H03c 1/52

[58] Field of Search ............. 332/44, 45 R; 325/137, 325/138, 136, 49, 50, 60, 38 R; 178/68

[56] References Cited

UNITED STATES PATENTS

| | | | |
|---|---|---|---|
| 3,522,537 | 8/1970 | Boughtwood | 325/50 X |
| 3,605,017 | 9/1971 | Chertok | 325/137 X |
| 3,688,196 | 8/1972 | Doelz | 325/50 |

*Primary Examiner*—Alfred L. Brody

*Attorney, Agent, or Firm*—R. S. Sciascia; G. J. Rubens

[57] ABSTRACT

Apparatus for digitally generating information tones and for translating the frequency of transient information tones to a spectrum location amenable to communications. In response to a digital data input, discrete tones of definite assigned frequency and duration are generated and economically combined to form a spurious-free, single-sideband, suppressed carrier signal. The frequency location of the signal is conveniently determined by an ordinary mixing process.

4 Claims, 1 Drawing Figure

PATENTED FEB 25 1975
3,868,601
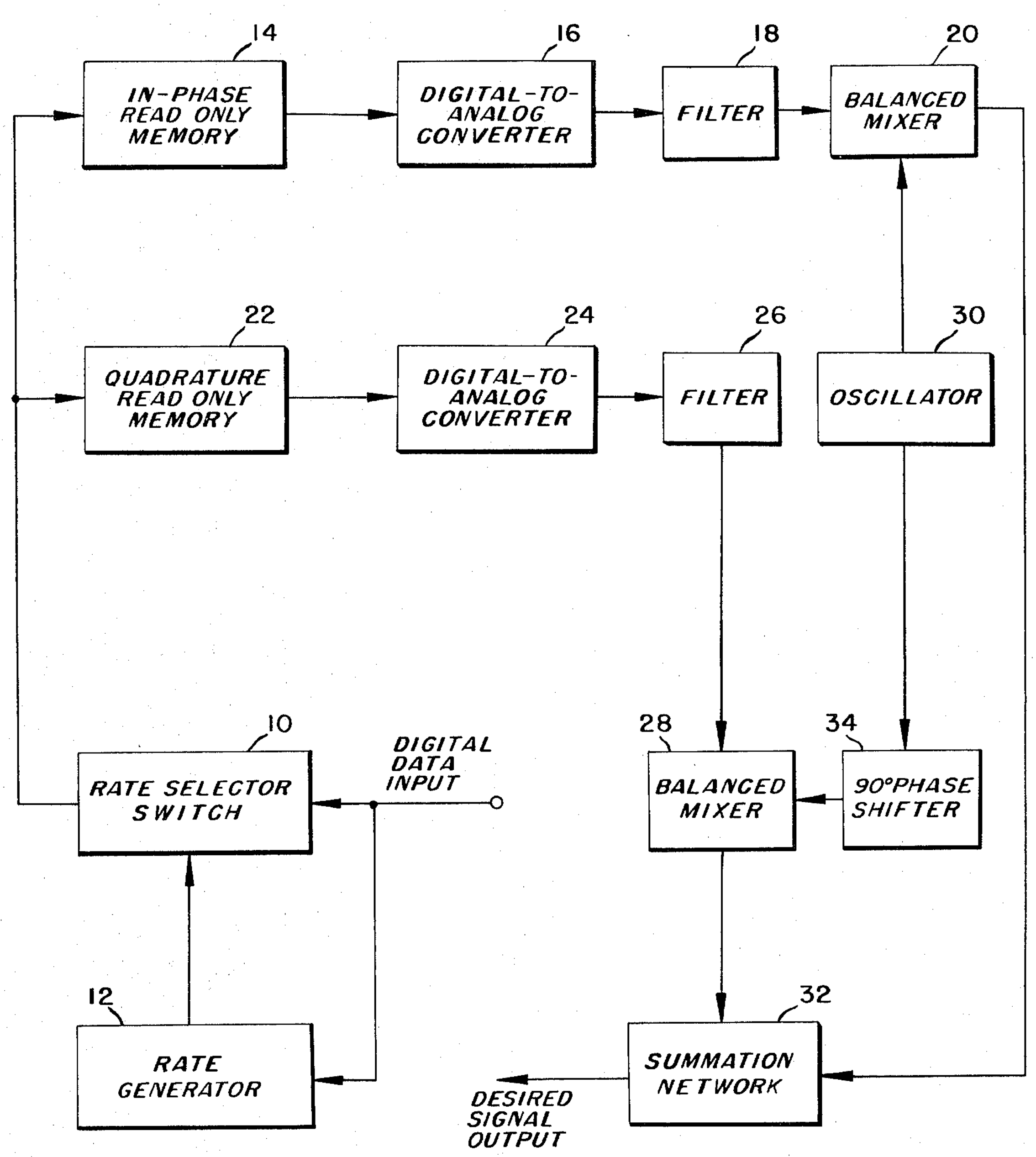

DIGITAL SINGLE-SIDEBAND MODULATOR

BACKGROUND OF THE INVENTION

The device disclosed herein generally falls within the category of single-sideband modulators known as Hartley modulators. However, other modulators employing the Hartley method utilize analog techniques and have difficulty achieving the inherently required broadband 90° phase shift. The essence of the usual Hartley single-sideband modulator is the combination of an in-phase signal with a quadrature replica of the in-phase signal. The signals are combined so that the desired suppressed carrier single-sideband output signal is produced. The usual Hartley modulator, for example, utilizes a voice signal to modulate a carrier which alone would result in a double sideband suppressed carrier signal. A second branch of the modulator would shift the voice signal by 90° and use its quadrature intelligence to modulate the carrier which is 90° out of phase with a carrier in the first branch. The double sideband suppressed carrier output signals of both these branches are algebraically added to produce the desired signal sideband.

SUMMARY OF THE INVENTION

Disclosed is modulator apparatus for digitally generating information tones and for translating the frequency of the tones to a spectrum location amenable to communication systems. Digital data input produces discrete tones of defininte precise frequency and duration which are economically combined to form a spurious free single-sideband suppressed carrier signal. The frequency location of the signal is determined by an ordinary mixing process. Control of frequency, phase, and duration of the information tone is performed entirely in the digital domain. Frequency of the tone is derived by digital division of an oscillator in a rate generator. Transition from one tone frequency to another is accomplished by simple digital gating techniques. By using a digital memory to store points of analog waveforms such that there is a desired phase relation among them, the modulator generates transient tones that are formed with the required phase relation.

OBJECTS OF THE INVENTION

It is the primary object of the present invention to disclose modulator apparatus for digitally generating information tones and for translating the frequency of the tones to a spectrum location amenable to communications.

It is another object of the present invention to provide a digital, single-sideband modulator in which the control of frequency phase and duration of information tones is performed entirely in the digital domain.

It is yet a further object of the present invention to provide modulator apparatus utilizing the digital memory to store points of analog waveforms such that there is a desired phase relation among them whereby transient tones can be generated which are formed with a required phase relation.

Other objects, advantages and novel features of the invention will become apparent from the following detailed description of the invention when considered in conjunction with the accompanying drawings.

BRIEF DESCRIPTION OF THE DRAWINGS

The FIGURE represents the simplified block diagram of the modulator embodying the present inventive concept.

DESCRIPTION OF THE PREFERRED EMBODIMENT

Incoming digital data is coupled to the pulse rate selector switch 10 and to the pulse rate generator 12. The generator 12 receives the data as a data source rate and produces discrete pulse rate (frequency tones) in response thereto whereby the frequency of a tone comprises the message received in digital format. The generator essentially comprises an oscillator whose output is digitally divided to produce the desired frequency tones in a conventional manner.

The pulse rates produced by the generator 12 are coupled to the rate selector switch 10 which selects the pulse rate corresponding to the particular digital signal received and as commanded by the incoming digital data. The switch 10 in its simplest form comprises a multiplexer.

The switch 10 and generator 12 thus produce a varying trigger rate or sample rate to the memories 14 and 22 in response to incoming digital data. The pulse rates produced are periodic and rate commandable.

The memory 14 accepts the output and stores the binary representation of the waveform desired. Each binary word stored therein represents an amplitude at a specific location on the waveform, which for exemplary purposes comprises a simple sinusoidal waveform. The rate of the trigger pulses from the rate generator switch determines the rate at which points (i.e., digital words) on the sinusoidal waveform are triggered out of the in-phase read-only memory 14. The preceding action functions to control the frequency of the tone.

The digital output of the read-only memory 14 is presented to the digital-to-analog converter 16. The digital memory word is therein converted to a corresponding analog magnitude on the sinusoidal waveform. The analog output of the converter 16 is applied to the filter 18. In the filter "steps" are removed from the analog waveform to produce at the output of the filter a smooth, high-quality sinusoidal waveform. This smooth output is fed to the balanced mixer 20.

The rate selector switch 10 also provides trigger pulses to the quadrature read-only memory 22. The quadrature memory is driven in synchronism with the in-phase memory 14 and also produces digital word outputs in response to the trigger pulses. The quadrature memory output is presented to the digital-to-analog converter 24 which converts the words to analog. The analog output therefrom is presented to the filter 26 which also smooths it to provide the information tone presented to the second balanced mixer 28.

The output of the local oscillator 30 is mixed in the mixer 20 to produce the in-phase carrier input to the summation network 32.

A local oscillator 30 feeds its output to the balanced mixer 20 and also to the phase shifter 34. The phase shifter provides a drive signal to the quadrature balanced mixer 28. The circuit 28 mixes the output of the filter 26 and the output of the phase shifter 34 and the mixer output is coupled to the summation network 32.

The summation network 32 also receives the output from the balanced mixer 20. The two inputs from the mixers 20 and 28 are algebraically summed therein to produce the desired single-sideband, suppressed carrier signal.

It can be appreciated that control of the frequency, phase, and duration of the information tone is performed entirely in the digital domain by the system of the FIGURE. Furthermore by storing the desired waveform and its phase-shifted replica in digital memories, the required phase relations between the transient tones are derived, the frequency of the required tones is achieved by digital division of the output of an oscillator in the rate generator 12.

Transition from one tone frequency to another is accomplished in the circuit by simple digital gating techniques which control and allow transitions to be made at any point on the sinusoidal waveform and any desired phase relation can be realized between the two channels. For example, the in-phase memory 14 may be commanded to switch frequencies at a positive-going, zero cross-over point of the sinusoidal waveform; the quadrature memory 22 would accordingly be switched at the 90° negative-going point.

Comparable performance from analog circuits would require elaborate magnitude and derivative sensing networks which have inherent stability problems. Furthermore, linear analog switching methods would generate switching transients within the signal spectrum and would most likely require complex filtering.

The present modulator can utilize very simple filtering since most of the switching transients are in the digital domain. Furthermore, any irregularities appearing in the output of the digital-to-analog converter 16 have a corresponding frequency spectrum far removed from that of the signal tones. This characteristic is inherent in the inventive concept since a tone is actually constructed from samples whose frequency is many times that of the tone. Therefore, it is very simple to filter the desired signal in such a manner as to readily remove undesired irregularities while maintaining excellent transient performance with regard to the desired signal.

Obviously, the disclosed concept offers the usual advantages usually associated with the use of digital techniques vis-a-vis analog methods. However, the concept offers further desirable advantages. For example, the general use of a digital memory to generate a specified analog waveform is well-known; however, the use of a digital memory to "store" points of analog waveforms such that a desired phase relation exists among them is considered novel since rather than attempting to derive the desired phase relationship between previously generated transient information tones the invention generates the transient tones in such a manner that they are formed already with the required phase relation.

If the information tones were generated by analog or digital methods, achieving the required 90° or other phase relation would present a number of problems. Other methods employ complicated amplitude and derivative sensing circuitry to determine at what points to switch from one tone frequency to another.

Moreover, any filtering usually must be performed relatively near the tone frequency. This requirement degrades realizable transient performance. The amplitude and derivative sensing circuitry along with the associated filtering required represents serious disadvantages of other known approaches.

Obviously many modifications and variations of the present invention are possible in the light of the above teachings. It is therefore to be understood that within the scope of the appended claims the invention may be practiced otherwise than as specifically described. For example, the digital representation of the desired analog waveform may be stored in a variety of types of memories. The read-only memory is emphasized since it represents the most likely and most economical implementation; in general, however, any one of several well-known digital memories can be used. These would include random access memories, read-mostly memories, shift register memories, and core memories.

Another alternative would be to use one memory in combination with accessing procedures to derive the required phase relations among the digital words. Furthermore, since the words are digital in nature, another alternative would be to derive the required phase relation by digital delay, for example, through a shift register. Then the delayed and undelayed signals would still have the digitally derived and controlled phase relationships.

What is claimed is:

1. Modulator apparatus comprising:

input means for receiving digital data;

generator means connected to said input means and being responsive to said digital data to produce trigger pulses at a selectively predetermined rate;

in-phase read-only memory means connected to the output of said generator means and being responsive to said trigger pulses to store the binary representation thereof on a selectively predetermined waveform and wherein each binary word stored represents a distinct amplitude of said waveform;

first digital-to-analog converter means connected to the output of said in-phase read-only memory means;

quadrature read-only memory means connected to the output of said generator means and being responsive to said trigger pulses in the same manner as said in-phase read-only memory means, second digital-to-analog converter means connected to the output of said quadrature read-only memory means;

first and second mixer means connected to the outputs of said first and second digital-to-analog converter means, respectively;

oscillator means connected at the output to said first mixer means to provide at the output thereof an in-phase carrier signal, and being further connected through a 90° phase shifter to said second mixer to provide a quadrature carrier signal; and, summation network means connected at the input to the outputs of said first and second mixer means and being responsive to said in-phase and quadrature carrier signals to provide a single-sideband, suppressed carrier signal.

2. The apparatus of claim 1 wherein said means for generating said trigger pulses comprises a rate generator and a rate selector switch connected in series with respect to each other and in parallel with respect to said input terminal means.

3. The apparatus of FIG. 1 further including first and second filter means connected between said first and second converter means and said mixer means, respectively, for smoothing the outputs of said converters.

4. Digital, single-sideband modulator apparatus comprising:

generator means responsive to digital data input for providing a frequency tone corresponding to a selectively predetermined digital input;

memory means connected to the output of said generator means for storing said frequency tone synchronously in-phase and in quadrature;

converter means connected to the output of said memory means for providing analog equivalent waveforms of said in-phase and quadrature representations;

oscillator means for providing a first drive signal and a second drive signal which is 90° out of phase with respect to said first drive signal;

first and second mixer means connected to the output of said converter means and to said oscillator means for mixing said in-phase analog waveform with said first drive signal to provide an in-phase carrier input and said quadrature analog waveform with said second drive signal to provide a quadrature carrier input, respectively; and, summation network means connected to the output of said first and second mixer means and being responsive to said in-phase and quadrature carrier inputs to provide a single-sideband suppressed carrier signal.

* * * * *